May 21, 1957     A. GRIMAL     2,792,884
STEREO FILM CUTTING DEVICE
Filed Sept. 7, 1955     2 Sheets-Sheet 2

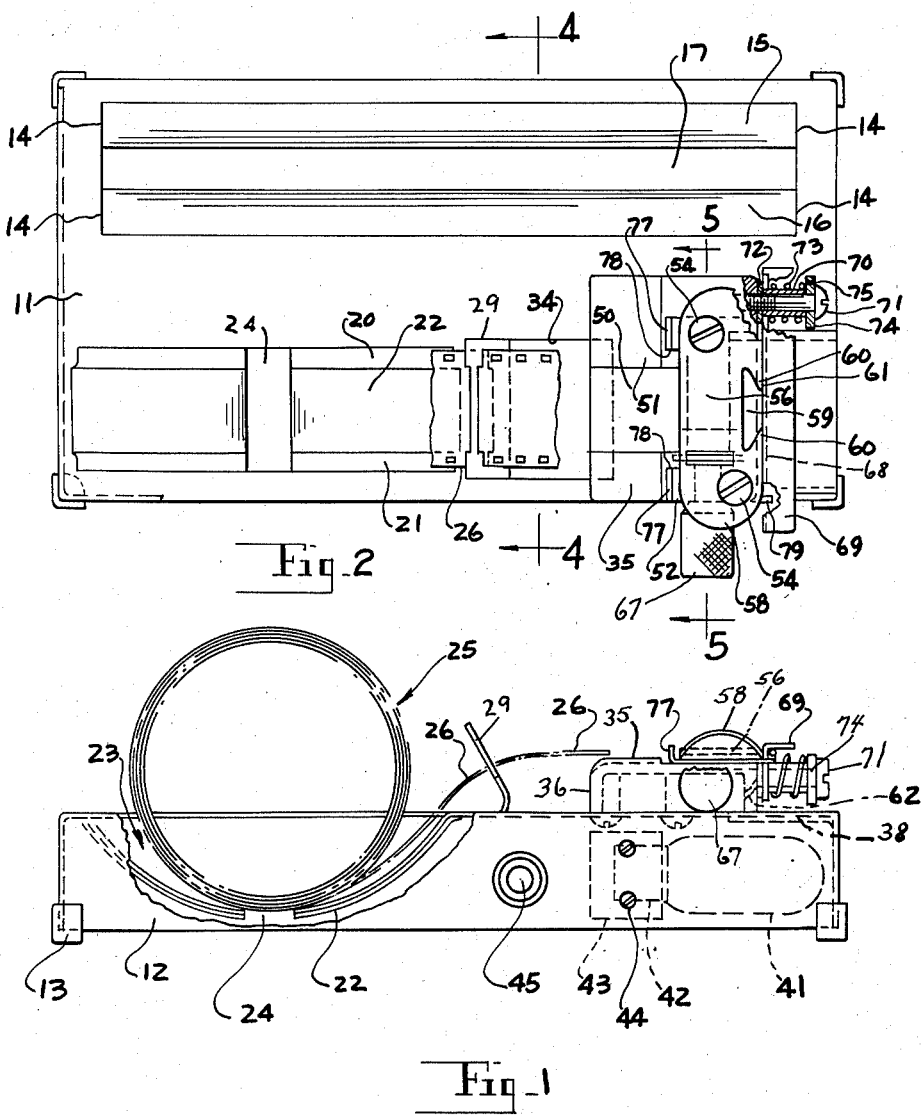

INVENTOR.
ADOLF GRIMAL
BY
*Robert A. Lloman*
ATTORNEY.

United States Patent Office 2,792,884
Patented May 21, 1957

2,792,884
STEREO FILM CUTTING DEVICE
Adolf Grimal, Walled Lake, Mich.

Application September 7, 1955, Serial No. 532,842

9 Claims. (Cl. 164—42)

This invention relates to a film cutting device and is more particularly adapted for the cutting of stereo films.

It is the object of the present invention to provide a novel stereo film cutting device which provides means for supportably mounting a reel of exposed film at its opposite marginal edges so as to protect the image portion of the film from physical injury.

It is the further object of the present invention to provide a novel film guide mechanism in conjunction with the body of the film cutting device which will further guide and yet protect the film from scratching for delivery upon a cutting table.

It is the further object of the present invention to provide an illuminated cutting table, together with an effective film hold-down mechanism which will guide and hold down the film and at the same time protect the same from scratching.

It is a further object of this invention to provide a pair of sighting points formed in film hold-down plate adapted to register with the stationary cutting edge.

These and other objects will be seen from the following specification and claims in conjunction with the appended drawings, in which:

Fig. 1 is a side elevational view of the present stereo film cutter partially broken away, for illustration.

Fig. 2 is a plan view thereof partially broken away and sectioned.

It will be understood that the above drawings illustrate merely a preferred embodiment of the invention and that other embodiments are contemplated within the scope of the claims hereafter set forth.

The present stereo film cutter has a top wall 11 and a depending peripheral flange 12 and with suitable, preferably rubber, legs 13 secured to the respective corners thereof.

Figure 4:
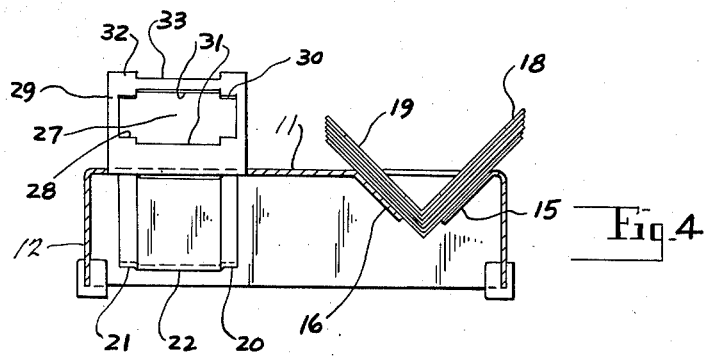
Fig. 4 is a section taken on line 4—4 of Fig. 2.

A pair of transverse slits 14 are formed through top wall 11 to thereby permit the downward and angular bending of the plates 15 and 16, Fig. 4, providing the central elongated slot 17 adapted to receive one or more stacks of film folders 18 having a plurality of pairs of opposed registering apertures 19 through which the cut stereo film elements may be viewed before mounting upon a film supporting mask, such as might be used in a stereo film projector.

Formed within top wall 11 and depressed therebelow, are a pair of arcuate opposed ledges 21 and 20; and intermediate said ledges a depressed wall portion 22, there being a transverse slot 24 formed at the bottom of said ledges and depressed wall as indicated in Fig. 1. There is thus defined within the said top wall 11 the film storage chamber 23 within which a roll of exposed stereo film 25 may be supportably positioned, as for example, 35 millimeter film.

The film unwinds from its bottom as by the leading film portion 26, which projects upwardly as shown in Fig. 1 and extends through the upwardly and rearwardly inclined formed guide 29, as shown in detail in Fig. 4. Said guide has a central film receiving aperture 27 which is bounded at the bottom thereof and at its opposite outer edges by a pair of raised ledges 28 adapted to cooperatively receive the opposed marginal edges of film 26 in supporting relation with the depressed portion 31 providing a clearance for the image portion of the film. There are also provided at the upper portion of slot 27 and bounding a portion thereof a pair of depending shoulders 30 adapted to cooperatively engage marginal portions of film 26 upon its upper surface, should film be moved in that direction, there being an intermediate depressed slot 31 between said ledges over which the image portion of the film would register.

Additionally, the film guide 27 has upon its top surface an additional pair of marginal projections 32 with an intermediate depression 33 whereby the film 26, if moved above the guide 29 and thereover, would be engaged at its marginal edges only to protect the central image portion against scratching.

This same result is also obtained by virtue of the arcuate spaced film roll supporting ledges 20 and 21 with the central depressed wall 22.

The said film guide 29 is formed by cutting a three-sided formation 34 within top wall 11 and with the material of the top wall encompassed thereby being bent upwardly and angularly rearward as in Fig. 1 to thereby define the said film guide. Said guide, of course, has already had formed therein the recess 27 and the above described film guiding and protecting shoulders.

Figure 5:
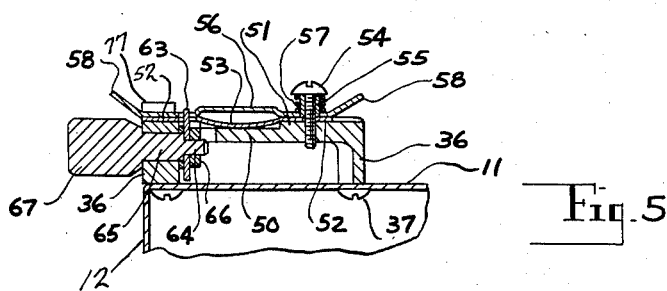
Fig. 5 is a section taken on line 5—5 of Fig. 2.
Figure 6:
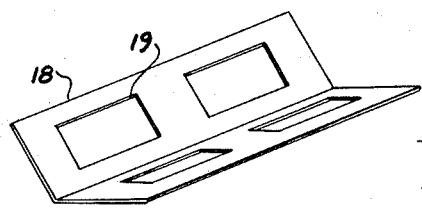
Fig. 6 is a perspective view of a partially folded cut film supporting folder.

A cutting table is mounted upon top wall 11 and includes the horizontal film receiving top wall 35 having a plurality of depending supporting flanges 36 secured to said top wall 11 as by the screws 37, Fig. 5.

Below table top 35 and formed within in top wall 11 are a pair of parallel spaced horizontally extending slightly depressed elongated flanges 39 and 40 which are adapted to support at its opposite margins the transparent plate or glass 38, and which may be suitably secured thereto in any convenient manner.

Figure 3:
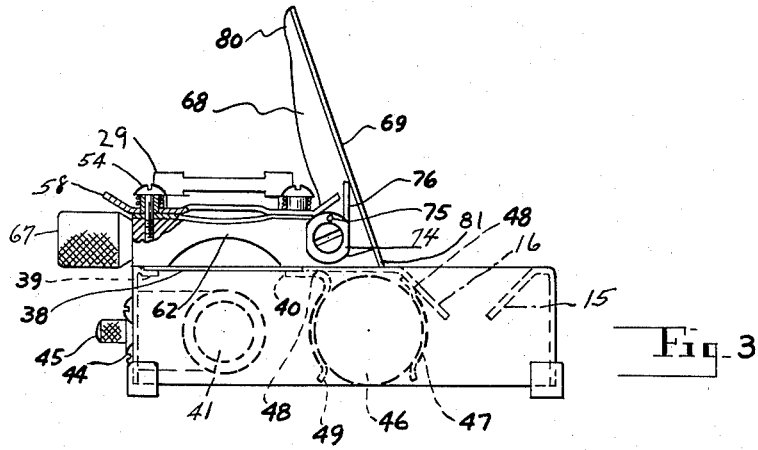
Fig. 3 is a right end elevational view thereof.

In the preferred embodiment of the present invention there is provided a suitable bulb 41, whose base 42 is positioned within a suitable socket 43 and which is anchored to the interior side wall 12 as by the screws 44, Fig. 3. A suitable push button type of switch is generally indicated at 45 and which is adapted to establish proper electrical connection between the lamp 41 and the storage battery 46, which, in the preferred embodiment, is retained between a pair of spring clips 47 outturned at their bottom open margins at 48 for receiving the battery 46, said spring clip being suitably secured to the under surface of platform 11 in the manner illustrated in Fig. 3, as by the welds 48.

The table 35 has an elongated depressed film platform 50, having a pair of elevated shoulders 51 in spaced relation on its opposite sides adapted to cooperatively and supportably receive marginal portions of the film 26. Also positioned across the forward end of table 35 is a stationary shear blade 52 whose central portion is depressed slightly as at 53 and which blade is transversely apertured to receive the securing screws 54. Bushings 55 surround said screws and at their lower ends operatively engage the top surface of the stationary blade 52—53 for securing the same in position.

There is provided above table 35 adjacent portions of blade 52 the film hold-down plate 56 whose central portions are slightly elevated, as shown in Fig. 5, and whose opposed edge portions are vertically displaced downwardly and adapted for cooperative engagement with the side portions of blade 52, there being suitable coiled springs 57 mounted around bushings 55 on screw 54, whereby the said plate 56 is resiliently urged downwardly against blade 52 for loosely holding down film 26 as it is fed thereunder, said film being adapted to move between hold-down plate 56 and the stationary shear blade 52.

The opposite ends of hold-down plate 56 are angularly and outwardly upturned as at 58 to facilitate manual lifting of said hold-down plate as desired, particularly in the initial insertion of the free end of the film below said plate and above blade 52.

The forward portion of hold-down plate 56, as shown in Fig. 2, is transversely apertured at 59 to define the opposed inwardly projecting edge sighting points 60 which cooperate with the forward edge 61 of hold-down plate 56, and which is also in vertical registry with the leading cutting edge of the stationary blade 52.

By this construction, the operator may manually feed the film 26 forwardly until the portion of the film desired to be cut is in exact vertical registry with the sighting points 60 and which corresponds to the cutting line between the stationary blade 52 and the movable cutting blade 68, shown in Fig. 3.

Adjacent the forward end of the support 35 and upon its under surface there is a curved deflector plate 62 which is so arranged as to permit light rays from the lamp 41 to move upwardly through the transparent plate 38 in order to illuminate the sighting points 60 and to facilitate proper registry of the film with respect to the cutting edge of the blades 52 and 68.

Film feed sprocket 63 is centrally secured on the spindle formation 64 adjacent the cylindrical hub 65 having handle 67, Fig. 5. The hub 65 is journalled through the upright wall portion 36 of the table 35; and the sprocket teeth are adapted to operatively engage the longitudinally spaced conventional apertures of the film 26 to thereby manually feed the said film through the guide 29 and over the top of table 35 and on to the stationary cutting edge for plate 52.

There is provided a manually operable and swingable cutting blade 68, Fig. 3, having a flat right angularly related mounting top flange 69. One end portion of said blade 68 is swivelly journalled over the transverse bushing 70 of Fig. 2 which is secured upon the table 35 adjacent its forward edge as by the fastening screw 71, there being a suitable washer 72 interposed to effect proper spacing of the blade 68 with respect to the corresponding shearing edge of the stationary blade 52.

Coiled spring 73 surrounds bushing 70 and one end thereof is anchored within the enlarged portion 74 of said bushing which is in the nature of a washer as at point 75, Figs. 2 and 3. The other free end of said spring as at 76 bears against the under surface of plate 69 of the manually movable blade 68 for normally urging said blade upwardly to the inoperative position shown in Fig. 3.

Accordingly, after each downward projection of said blade utilizing the flange 69 as a handle, upon manual release thereof, said blade will return to the position shown in Fig. 3.

The stationary blade 52 has a pair of laterally spaced rearwardly extending arms 52 which terminate at their rear ends in the upturned spaced opposed film guides 77 whose inner opposed edges 78 are adapted to loosely and cooperatively receive the opposite marginal edges of film 26, guiding its feed movements into the film shearing mechanism above described.

As shown in Fig. 2, stop 79 projects forwardly of the forward edge portion of blade 52 and is adapted to cooperate with the reduced leading edge portion 80 of blade 68 for limiting the downward movement thereof.

Spring 73 also functions for establishing a pressure relation between blade 68 and stationary blade 52—53 to facilitate the cutting action.

The inner end of plate 69, Fig. 3, engages top wall 11 for limiting the opening movement of plate 68.

Having described my invention, reference should now be had to the claims which follow for determining the scope thereof.

I claim:

1. A stereo film cutter comprising a support housing with a top wall, a portion of said wall being arcuately depressed to form a concave film roll retaining section, a transversely apertured film receiving guide plate extending upwardly from said wall adjacent one end of said section, a cutting table mounted on and spaced above said wall forwardly of said guide, a horizontally disposed film supporting shear plate secured on said table having a transverse cutting edge overhanging one end of said table, a transverse vertically adjustable film hold-down plate loosely and yieldingly mounted above said shear plate, rotatable means journalled within said table in operative driving engagement with the film for effecting intermittent longitudinal feed movements thereof, and a knife pivotally mounted on one end upon said table having a depending cutting edge pivotally movable in a plane at right angles to the length of the film and registerable with the cutting edge of said shear plate.

2. The film cutter of claim 1, the opposed outer arcuate edges of said film roll retaining section being vertically displaced upwardly with respect to its intermediate portions for supportably receiving the opposite marginal edges of said film.

3. The film cutter of claim 1, opposed outer portions of said guide defining the lower boundary of its aperture being vertically displaced upwardly with respect to its intermediate portion for supportably receiving the opposite marginal edges of said film.

4. The film cutter of claim 1, outer portions of said guide defining the upper and lower horizontal boundaries of its aperture being vertically displaced inwardly with respect to its intermediate portions adapted for supportably and guidably receiving the opposite marginal edges of said film.

5. The film cutter of claim 1, said shear plate having a pair of parallel spaced rearwardly extending strips upturned at their ends defining a pair of upright film edge receiving guides.

6. The film cutter of claim 1, spaced upright screws secured to said table and extending above said shear plate, said film hold-down plate being apertured to loosely receive said screws and coiled springs on said screws bearing downwardly against said hold-down plate yieldably maintaining said plate against said film.

7. The film cutter of claim 1, spaced upright screws secured to said table and extending above said shear plate, said film hold-down plate being apertured to loosely receive said screws, coiled springs on said screws bearing downwardly against said hold-down plate yieldably maintaining said plate against said film, and upwardly and outwardly inclined lifting ears at opposite ends of said hold-down plate to facilitate starting the film thereunder.

8. The film cutter of claim 1, the leading transverse edge of said hold-down plate being in vertical registry with the cutting edge of said shear plate, there being an undercut transverse slot formed through said hold-down plate adjacent said leading edge defining a pair of opposed film sighting points in said leading edge adapted for registry with a predetermined line of cut for said film.

9. A stereo film cutter comprising a support housing with a top wall, a cutting table mounted on and spaced above said wall, a horizontally disposed film supporting shear plate secured on said table, a transverse film hold-down plate loosely and yieldingly mounted above said shear plate, rotatable means journalled within said table in operative driving engagement with the film for effecting intermittent longitudinal feed movements thereof, said shear plate having a pair of parallel spaced rearwardly extending strips upturned at their ends defining a pair of upright film edge receiving guides, and a knife pivotally mounted on one end upon said table having a depending cutting edge movable in a plane at right angles to the length of the film and registerable with the cutting edge of said shear plate, the leading transverse edge of said hold-down plate being in vertical registry with the cutting edge of said shear plate, there being an undercut transverse slot formed through said hold-down plate adjacent said leading edge defining a pair of opposed film sighting points in said leading edge adapted for registry with a predetermined line of cut for said film.

References Cited in the file of this patent
UNITED STATES PATENTS

| | | |
|---|---|---|
| 1,044,258 | Schafer | Nov. 12, 1912 |
| 1,095,874 | Jella | May 5, 1914 |
| 1,119,451 | Power | Dec. 1, 1914 |
| 1,210,212 | Ross | Dec. 26, 1916 |
| 1,260,185 | Gonsky | Mar. 19, 1918 |
| 1,331,563 | Genter | Feb. 24, 1920 |
| 1,349,421 | Granz | Aug. 10, 1920 |
| 1,866,711 | Jones | July 12, 1932 |
| 1,916,311 | Hayden | July 4, 1933 |
| 2,174,660 | Hirsch | Oct. 3, 1939 |
| 2,297,525 | Aneuser | Sept. 29, 1942 |
| 2,325,823 | Wilson | Aug. 3, 1943 |
| 2,511,041 | Bowden | June 13, 1950 |
| 2,643,017 | Mack | June 23, 1953 |
| 2,675,736 | Gentilini | Apr. 20, 1954 |